(12) United States Patent
Chen et al.

(10) Patent No.: US 9,909,641 B2
(45) Date of Patent: Mar. 6, 2018

(54) ISOLATION MOUNT FOR SHOCK ATTENUATION

(71) Applicant: Raytheon Company, Waltham, MA (US)

(72) Inventors: Yifang Chen, Newnan, GA (US); Bianca R. Rhodes, Tucson, AZ (US); Stephen J. Forgacs, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/098,458

(22) Filed: Apr. 14, 2016

(65) Prior Publication Data

US 2017/0299012 A1    Oct. 19, 2017

(51) Int. Cl.
F16M 13/00    (2006.01)
F16F 15/08    (2006.01)
F16F 1/373    (2006.01)

(52) U.S. Cl.
CPC ............ F16F 15/08 (2013.01); F16F 1/3732 (2013.01)

(58) Field of Classification Search
CPC .............................. F16F 1/3814; F16F 1/3842
See application file for complete search history.

(56) References Cited

U.S. PATENT DOCUMENTS

| | | | |
|---|---|---|---|
| 2,749,160 A * | 6/1956 | Cowles | F16F 1/3842 267/141.3 |
| 4,109,979 A * | 8/1978 | Estaque | B60G 7/02 267/269 |
| 7,246,785 B2 | 7/2007 | Monson et al. | |
| 7,325,792 B2 | 2/2008 | Siino et al. | |
| 7,706,213 B2 | 4/2010 | Winfree et al. | |
| 7,784,773 B1 | 8/2010 | Sanetick et al. | |
| 7,856,916 B2 | 12/2010 | Anderson | |
| 7,918,439 B2 * | 4/2011 | Morales Arnaez | B29C 45/14 267/141.3 |

(Continued)

FOREIGN PATENT DOCUMENTS

FR    2 816 685 A1    5/2002

OTHER PUBLICATIONS

Innternational Search Report and Written Opinion for corresponding International Application No. PCT/US2016/056379 dated Feb. 22, 2017.

*Primary Examiner* — Amy J. Sterling
(74) *Attorney, Agent, or Firm* — Renner, Otto, Boisselle & Sklar, LLP (57) ABSTRACT

An isolator mount system includes multiple isolator mounts that are used to isolate a piece of equipment from a structure. The isolation mounts each include an isolation pad between inner and outer mountings, to provide damping between relative motions of the inner mounting and the outer mounting. A central portion of the isolation pad is closer to a central axis of the isolation mount than are ends of the isolation pad that are on opposite sides of the central portion. This configuration provides two shear sections, to provide additional damping, an additional amount of shear in the isolator mounts. The shear sections may be configured to control location of the center of elasticity of the system, for example by locating the center of elasticity at the same location as the center of gravity of the system, thereby resulting in an isoelastic system.

16 Claims, 8 Drawing Sheets

(56) References Cited

U.S. PATENT DOCUMENTS

| | | | |
|---|---|---|---|
| 8,579,510 B2* | 11/2013 | Noble | F16F 1/3842 267/293 |
| 2007/0290425 A1* | 12/2007 | Heuer | F16F 1/3814 267/293 |
| 2009/0289400 A1 | 11/2009 | Dietrich | |
| 2014/0085778 A1 | 3/2014 | Braman et al. | |
| 2015/0053028 A1* | 2/2015 | Tvaruzek | F16H 23/00 74/60 |

* cited by examiner

ISOLATION MOUNT FOR SHOCK ATTENUATION

GOVERNMENT LICENSE RIGHTS

This invention was made with Government support under Contract No. HQ0147-12-C-0004, awarded by the Department of Defense. The Government has certain rights in the invention.

BACKGROUND OF THE INVENTION

Field of the Invention

The invention is in the field of dampening systems.

Description of the Related Art

There is a need in a large number of areas for dampening mechanism for attenuating vibrations or other excitations. For example, sometimes electronic equipment is used in vibration-rich environments, where isolation of the equipment is useful in maintaining good functioning of the equipment.

SUMMARY OF THE INVENTION

An isolation mounting system is capable of attenuating vibrations in both the low and high frequency ranges. Attenuation over a wide spectrum of frequency ranges has proven difficult to achieve but is highly desirable in applications using sensitive, high precision instrumentation such as guidance electronics in space applications, for example. Current attenuating devices do not provide attenuation in both the low and high frequency regions while also imparting only minimal angular rotations to the equipment.

According to an aspect of the invention, an isolation mount includes an outer mounting, an inner mounting radially within the outer mounting, and an isolation pad between the inner mounting and the outer mounting. The isolation pad conforms to the shape of the void between the outer mounting and inner mounting.

According to another aspect of the invention, the isolation pad provides damping between motions of the inner mounting and the outer mounting, providing a minimum attenuation of 10 dB in frequencies above 20 kHz.

According to yet another aspect of the invention, the isolation mount attaches to an isolated structure, through a radial bolt pattern, and to an exterior structure with an axial bolt pattern.

According to still another aspect of the invention, the isolation mount limits the dynamic deflection and rotations of the system between the isolated electronic devices and its exterior mounting structure to accommodate small design spaces and adhere to a tilt sensitivity allowable of 20 µrad/g.

According to a further aspect of the invention, the resonant modes of the isolation mount are between 300 and 500 Hz, for first order translational and rotational modes.

According to another aspect of the invention, the isolation pad of the isolation mount is made of an elastomer or substantially equivalent conforming material.

According to an aspect of the invention, an isolation mount includes: an outer mounting; an inner mounting radially within the outer mounting, and an isolation pad between the inner mounting and the outer mounting, the isolation pad providing damping between motions of the inner mounting and the outer mounting. The isolation pad surrounds a central axis of the mount. A central portion of the isolation pad is closer to the central axis than ends of the isolation pad that are on opposite sides of the central portion. A radially inner surface of the isolation pad conforms to a radially outer surface of the inner mounting. A radially outer surface of the isolation pad conforms to a radially inner surface of the outer mounting.

According to another aspect of the invention, an isolation mount system includes: a series of isolation mounts that support and isolate equipment. Each of the isolation mounts includes: an outer mounting; an inner mounting radially within the outer mounting, and an isolation pad between the inner mounting and the outer mounting, the isolation pad providing damping between motions of the inner mounting and the outer mounting. The isolation pad surrounds a central axis of the mount. A central portion of the isolation pad is closer to the central axis than ends of the isolation pad that are on opposite ends of the central portion. A radially inner surface of the isolation pad conforms to a radially outer surface of the inner mounting. A radially outer surface of the isolation pad conforms to a radially inner surface of the outer mounting.

According to an embodiment as in any preceding paragraph(s), the radially inner surface of the isolation pad and the radially outer surface of the isolation pad slope radially inward from the ends toward the center portion.

According to an embodiment as in any preceding paragraph(s), the radially inner surface of the isolation pad and the radially outer surface of the isolator pad transition from the ends to the central portion.

According to an embodiment as in any preceding paragraph(s), the isolation pad is made of an elastomer.

According to an embodiment as in any preceding paragraph(s), the outer mounting includes a means for connecting the isolation mount to a structure.

According to an embodiment as in any preceding paragraph(s), the inner mounting has a through-passage to mount an isolated mass.

According to an embodiment as in any preceding paragraph(s), the ends of the isolation pad slope away from the central axis at one or more constant slopes.

According to an embodiment as in any preceding paragraph(s), the ends of the isolation pad flare away from the central axis.

According to an embodiment as in any preceding paragraph(s), the ends have identical shapes.

According to an embodiment as in any preceding paragraph(s), the ends have different shapes.

According to an embodiment as in any preceding paragraph(s), the isolation mount is in combination with other isolation mounts, for supporting a cradle that receives equipment to be isolated.

According to an embodiment as in any preceding paragraph(s), the system includes at least three of the isolation mounts.

According to an embodiment as in any preceding paragraph(s), the system includes four of the isolation mounts.

According to an embodiment as in any preceding paragraph(s), the system includes the equipment; and a cradle for mounting the equipment to the isolation mounts; and a center of elasticity of the isolation mount system is aligned with a combined center of mass of the equipment and the cradle.

According to an embodiment as in any preceding paragraph(s), the system has a resonant mode of 300 Hz to 500 Hz.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

An isolator mount system includes multiple isolator mounts that are used to isolate a piece of equipment from a structure. The isolation mounts each include an isolation pad between inner and outer mountings, to provide damping between relative motions of the inner mounting and the outer mounting. A central portion of the isolation pad is closer to a central axis of the isolation mount than are ends of the isolation pad that are on opposite sides of the central portion. This configuration provides two shear sections, to provide additional damping, an additional amount of shear in the isolator mounts. The shear sections may be configured to control location of the center of elasticity of the system, for example by locating the center of elasticity at the same location as the center of gravity of the system, thereby resulting in an isoelastic system. In one embodiment the piece of equipment is an inertial measurement unit, and the structure is a fuselage, such as that of a missile.

Figure 1:
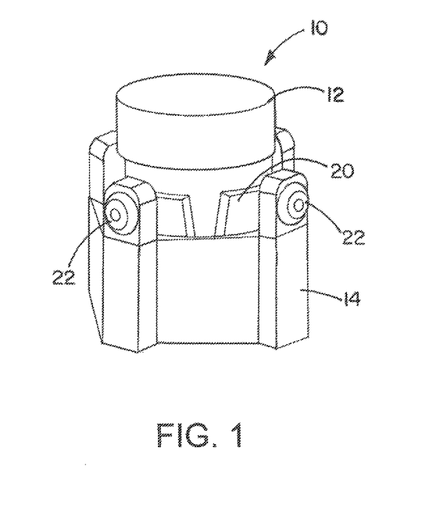
FIG. 1 is an oblique view of an isolator mount system according to an embodiment of the present invention.
Figure 2:
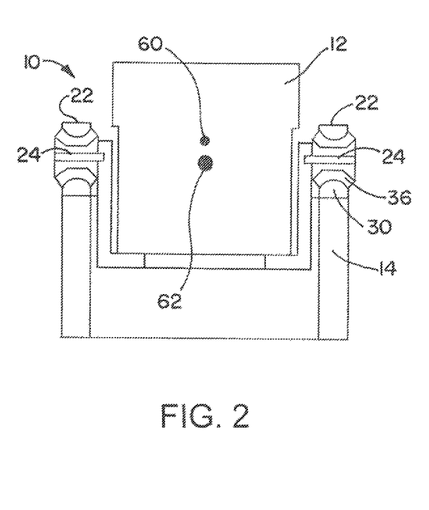
FIG. 2 is a side cross-sectional view of the isolator mount system of FIG. 1.

FIGS. 1 and 2 show an isolation mount system 10 for providing vibration damping/isolation for a piece of equipment 12, an inertial measurement unit (IMU) in the illustrated embodiment, relative to structure 14, which in the illustrated embodiment is a missile fuselage. Although the system 10 is described herein as used for mounting an IMU, it should be understood that the isolator mount system 10 and its components (or similar components) may be used to provide vibration isolation for any of a variety of other types of equipment.

The mount system 10 includes a cradle 20 that receives the equipment 12 (the IMU). The cradle 20 moves along with the equipment 12, and provides a ready means of mounting the equipment 12 within the mount system 10. The cradle 20 is supported on a set of isolation mounts 22 that are attached to the structure 14. In the illustrated embodiment there are four of the isolation mounts 22, but in other embodiments there may be a different number of the mounts 22. The mounting scheme creates indirect load path, thus providing attenuation during shock events.

Figure 3A:
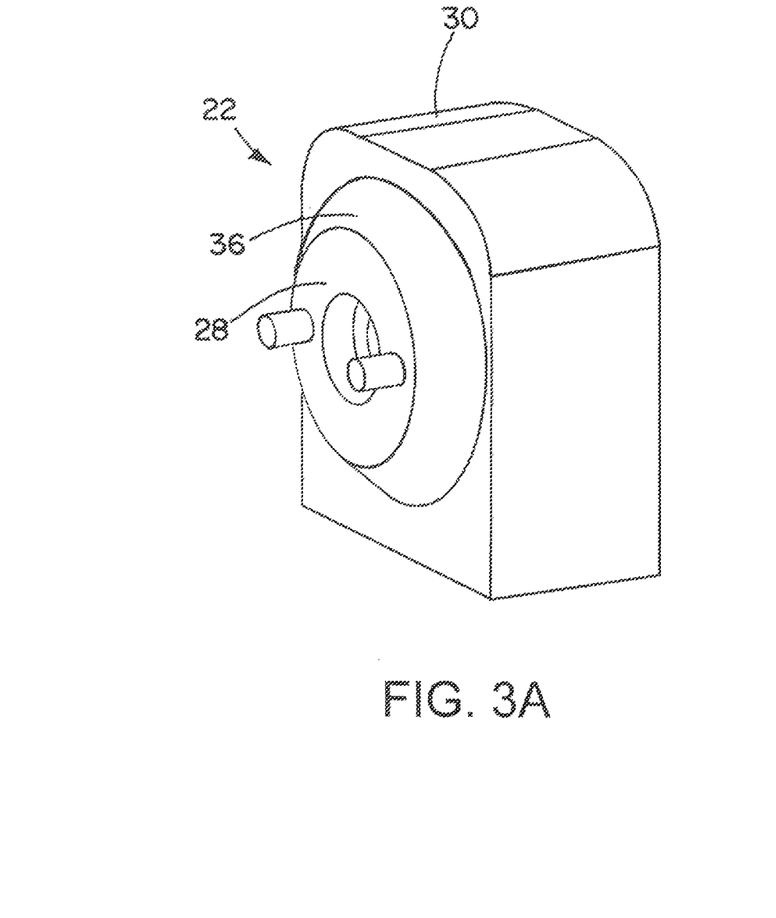
FIG. 3A is an oblique view of an isolation mount of the system of FIG. 1.
Figure 3B:
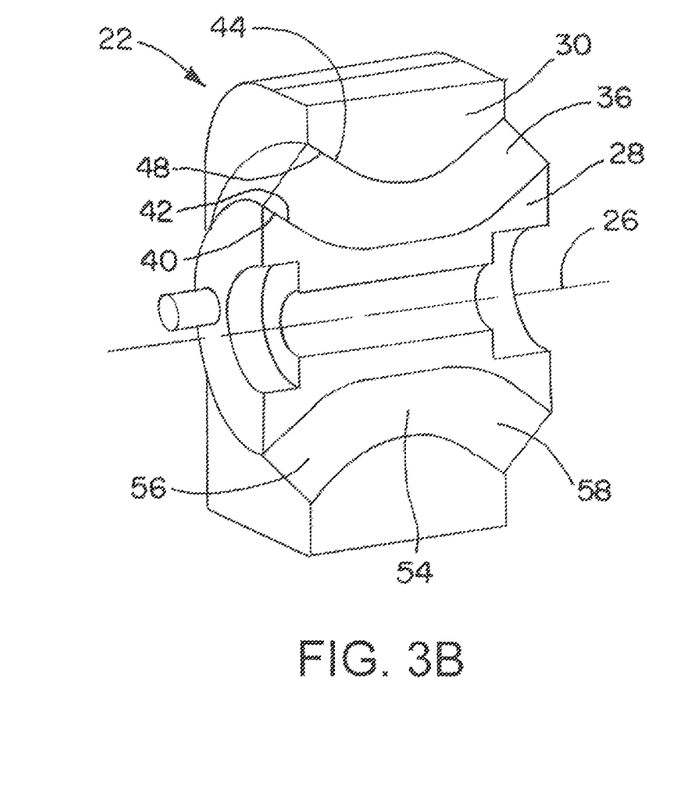
FIG. 3B is a cross-sectional view of the isolation mount of FIG. 3A.

Referring now in addition to FIGS. 3A and 3B, pins 24 of the mounts 22 pass through central axes 26 of the isolation mounts 22. The pins 24 are used to secure the cradle 20 to inner mountings 28 of the isolation mounts 22, while still allowing some relative (damped) movement between the cradle 20 and the structure 14. The mounts 22 each have a respective housing 30. The mounts 22 may each attach to the exterior structure with an axial bolt pattern, that receives suitable threaded fasteners (e.g., screws or bolts) or other mechanical connectors. The housing 30 is radially offset from the central axis 26, and circumferentially surrounds the axis 26, the pin 24, and the inner mounting 28. The pins 24 secure the inner mountings 28 to the cradle 14, and the housings 30 function as outer mountings, securing the mounts 22 to the structure 14. Alternatively this arrangement could be reversed, with the inner mountings secured to the structure, and the outer mountings (housings) secured ultimately to the equipment. Alternative for the pins 24 include a wide variety of mechanical fasteners, such as suitable screws or bolts. The inner mountings 28 may be counterbored to receive heads of the pins 24 or other fasteners.

For each of the mounts 22, an isolation pad 36 is located between a pair of mounting flanges, the inner mounting 28 and the housing 30. The isolation pad 36 is used for dampening shocks and/or vibrations, to provide isolation between the equipment 12 and the structure 14. The isolation pad 36 surrounds the central axis 28. A radially inner surface 40 of the isolation pad 36 conforms to a radially outer surface 42 of the inner mounting 28. Also a radially outer surface 44 of the isolation pad 36 confirms to a radially inner surface 48 of the housing 30.

The isolation pad 36 has a central portion 54 between a pair of ends 56 and 58 that are on opposite ends of the central portion 54 in an axial or lateral direction (a direction parallel to the central axis 28). The central portion 54 is the part of the isolation pad 36 that is closest radially to the central axis 28, with the ends 56 and 58 radially farther from the central axis 28 than is the central portion 54. This revolved double shear configuration for the isolation pad 36 allows for system to behave as if numerous isolators are working in parallel thus increasing the stiffness of the isolation system to a higher frequency regime without changes to the material properties or without significant impact to the volume constraints. The double-shear feature provides attenuation in both the low and high frequencies with only minimal angular rotations imparted to the unit. It allows for optimal damping in all three translational directions.

The isolation pad 36 may be made of an elastomer or another material that is able to resiliently deform in response to stresses. One suitable material for the isolation pad 36 is silicone. The formulation of the elastomer or other material may be selected, and/or may be changed, such as by control of additives, to obtain material properties that result in desired performance. The isolation pad 36 is shaped such that it provides damping in all three orthogonal directions, placing the material of the isolation pad 36 in sheer when exercised in any direction. The configuration of the isolation pad 36 may be such so as to approach an isoelastic system, with a center of elasticity (COE) 60 of the isolation mounts 22 aligned with a center of gravity (CG) 62 of what is supported by the mounts, the equipment 12 and the cradle 20. The mount system 10 may be configured such that the transverse modes of the system 10 (the vibrations in directions perpendicular to the vertical direction in FIG. 1 are aligned. In addition vibrations in the axial mode may also be aligned if desired. The angling away of the ends 56 and 58 from the central portion 54 may be done in such a way as to allow alignment of the center of elasticity (COE) 60 to the center of gravity (CG).

Figure 4A:
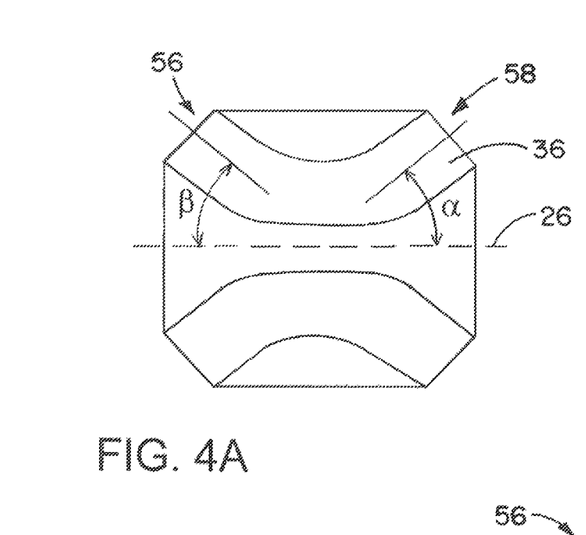
FIG. 4A is a cross-sectional view of a first isolation pad configuration for the isolation mount of FIG. 3A.
Figure 4B:
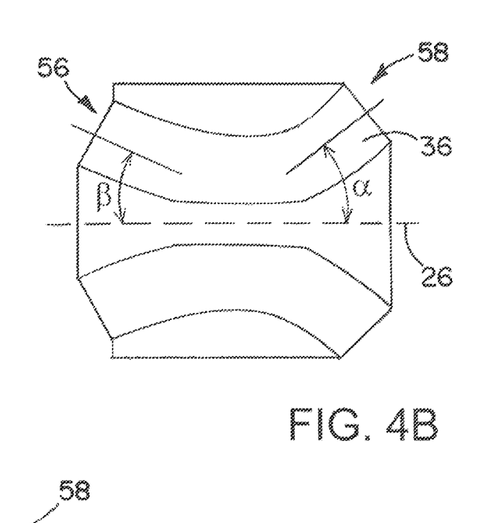
FIG. 4B is a cross-sectional view of a second isolation pad configuration for the isolation mount of FIG. 3A.
Figure 4C:
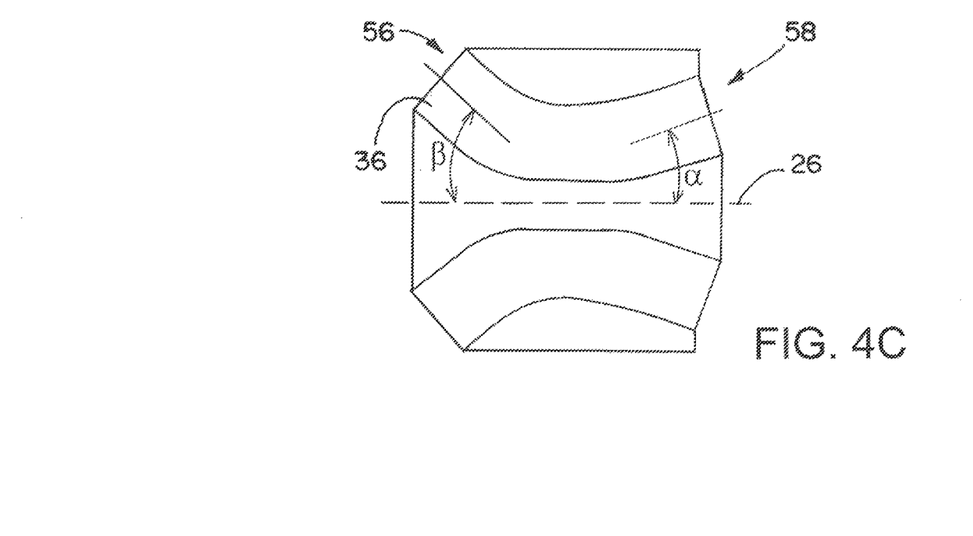
FIG. 4C is a cross-sectional view of a third isolation pad configuration for the isolation mount of FIG. 3A.

Referring in addition to FIGS. 4A-4B, different angles α and β can be selected for the ends 56 and 58, with the end 56 farther than the end 58 from the equipment 12. When α=β (both of the ends 56 and 58 angled away from the central axis 28 at the same angle), the center of elasticity (COE) 60 (FIG. 2) is located in the plane of the centerlines of the mounts 22. This configuration is illustrated in FIG. 4A. For α>β, as shown in FIG. 4B, the COE 60 is located above the plane of the centerlines of the mounts 22. For α<β, as shown in FIG. 4C, the COE 60 is located below the plane of the centerlines of the mounts 22. Thus by configuring the mounts 22, and specifically the isolation pads 36, the COE 60 can be positioned as desired.

The isolation pads 36 may have constant or substantially constant thickness in their material. Alternatively the isolation pads 36 may have a thickness that varies, with the pads 36 being having different thicknesses at different locations.

As another alternative, the isolations pads 36 may have flared shapes, with the ends angling further away from the central axis at further distances from the central portion 54 of the pad. Flared ends may have any of a variety of configurations to achieve various effects, with the ends having similar shapes or different shapes. One advantage of some flaring the ends is smoothing the transition between the central portion and the ends, which may aid in attenuating shocks and vibrations.

The isolation mount system 10 advantageously provides higher resonant frequencies as a result of the arrangement of the mounts 22, as well as better performance in general in attenuating high frequency vibrations, such as vibrations in the high-frequency range (for example in excess of 20 kHz). The resonant modes of the isolation system 10 may be between 300 and 500 Hz, for first order translational and rotational modes. More narrowly, the resonant modes may be between 300 and 380 Hz.

Figure 5:
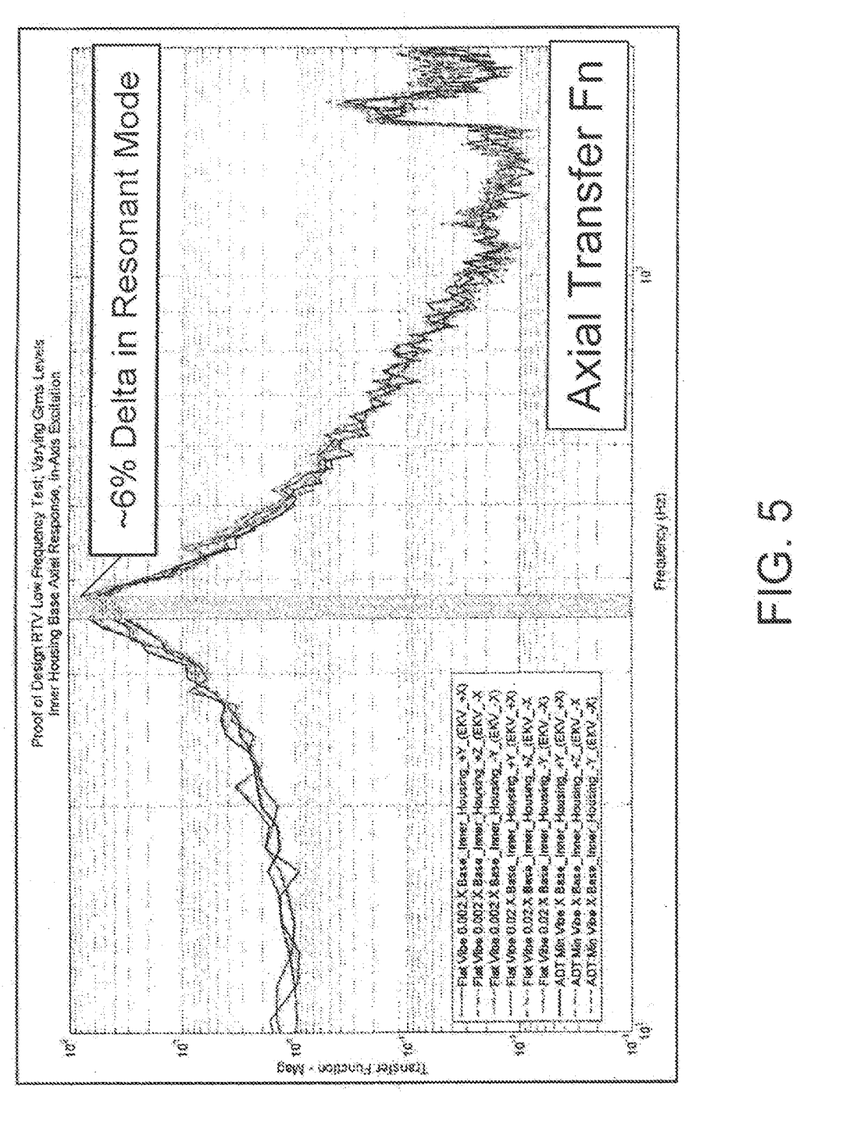
FIG. 5 is a plot showing transfer function versus frequency for axial (vertical) excitations of various levels, in an example embodiment.
Figure 6:
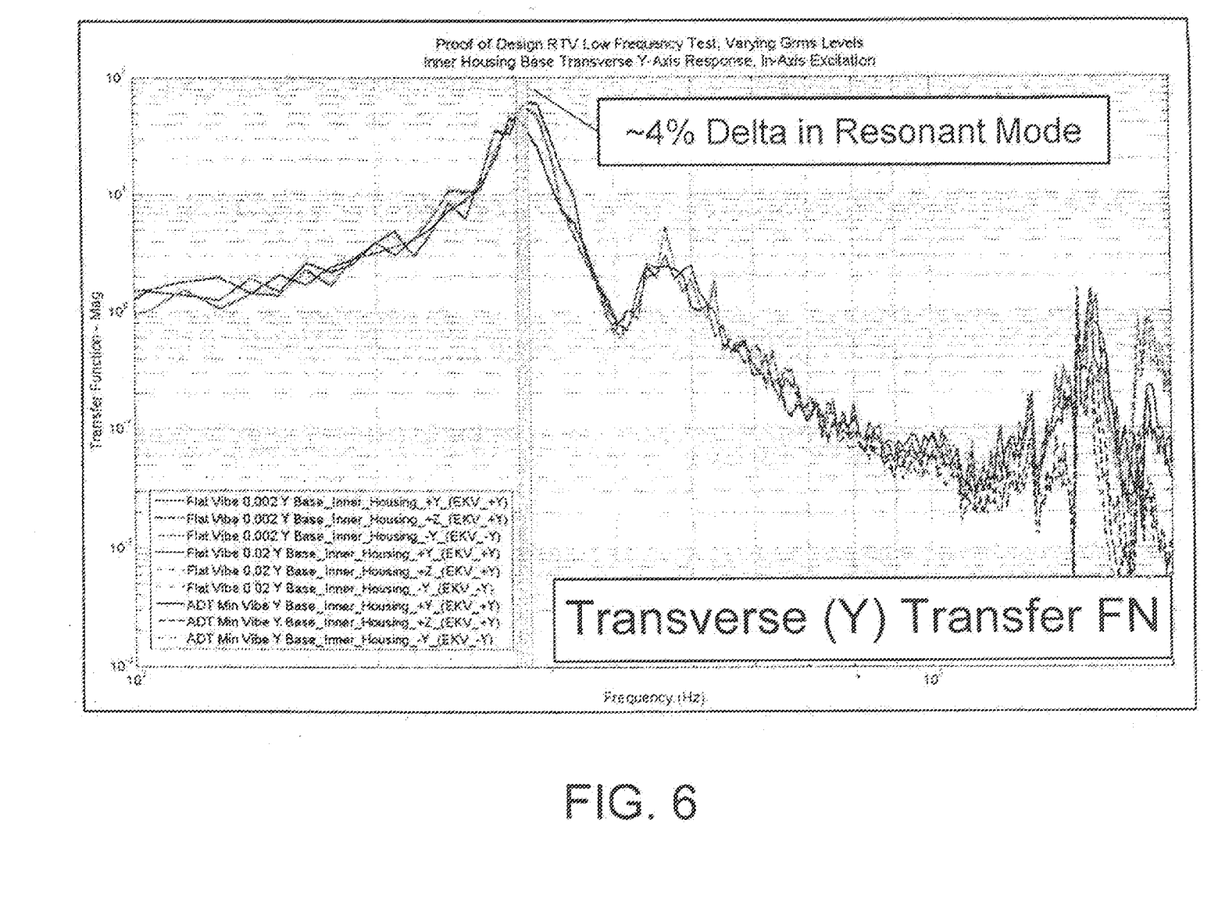
FIG. 6 is a plot showing transfer function versus frequency for excitations of various levels in one transverse direction, in an example embodiment.
Figure 7:
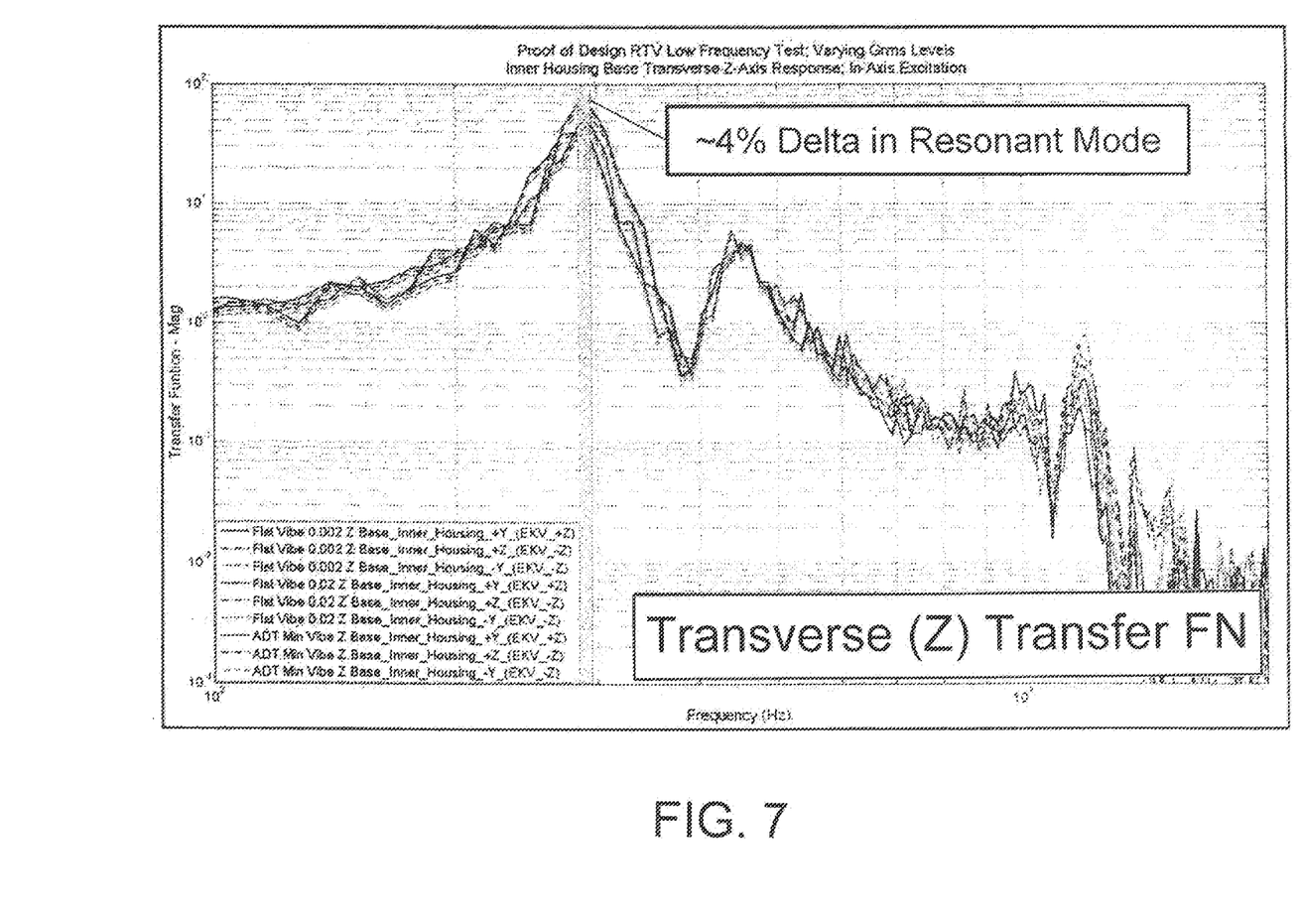
FIG. 7 is a plot showing transfer function versus frequency for excitations of various levels in another transverse direction, in an example embodiment.

In addition the response of the system 10 varies little with changes in the magnitude of excitations in the environment. This is illustrated in FIGS. 5-7, which show plots of transfer function (gain) versus frequency for responses in three axes, for multiple levels of excitation. The axial response (FIG. 5) is the response to excitations in the vertical direction shown in FIG. 2. The transverse responses (FIGS. 6 and 7) are the responses in the directions orthogonal to the vertical direction and each other. The plots show the response in transfer function (gain) versus frequency for four different values of root mean square acceleration ($G_{rms}$) of input (excitation), from 2.4 to 13.8 $G_{rms}$. Even though there is a fivefold increase of $G_{rms}$ over this range, there is little change in the resonant modes of the system, the frequencies at which the maximum gain occurs. For the axial mode, there is about a 6% change in the resonant mode frequency over the range of excitation. For the transverse modes, there is about a 4% change in the resonant mode frequency over the range of excitation. This stability of resonant modes advantageously results in a similar response of the system over a range of excitations. The stability in resonant modes is an indicator that the material of the isolation pad 36 is in a linear response range for these excitations.

Figure 8:
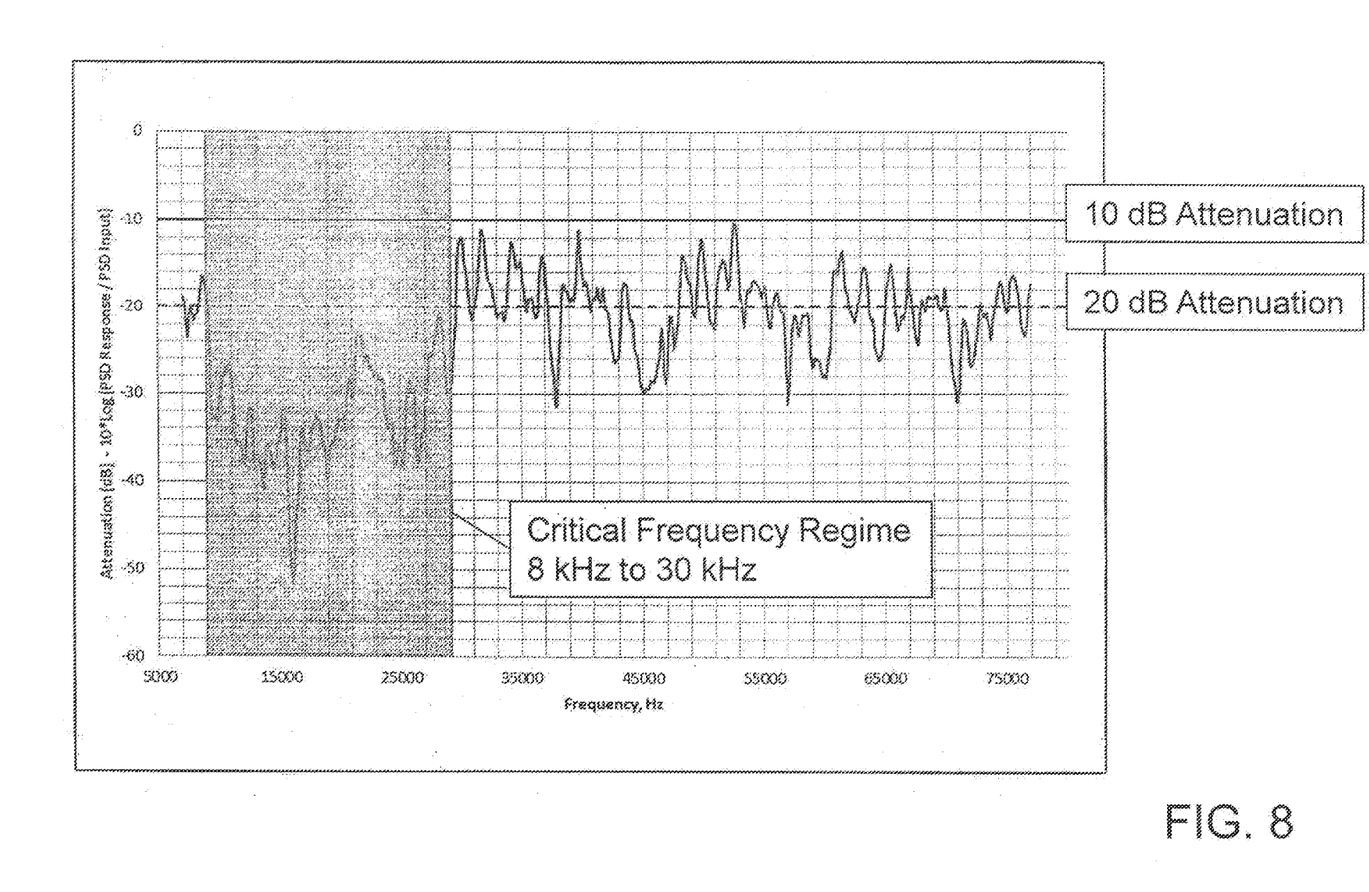
FIG. 8 is a plot showing attenuation versus frequency for an embodiment system exposed to a higher frequency dynamic environment.

FIG. 8 shows test results from the system 10 when exposed to a higher frequency dynamic environment. This allows quantification of the amount of attenuation provided by the system 10 to the equipment 14. It was found that the system 10 proved capable of providing a minimum of 10 dB attenuation in high frequency ranges (greater than 20 kHz), and more than 20 dB of attenuation in the range of 8 to 30 kHz, which can be an important frequency range for maintaining proper operations of electronic equipment.

The system 10 may be able to allow the equipment 12 to be isolated from environmental vibrations, with only small amounts of sway and/or tilt. This allows the equipment 12 to be placed in a relatively tight area, without much room for movement. For example the system 10 may face a requirement of maximum allowable rotation of 20 μrad/g about any axis when the system 10 is subjected to axial accelerations (accelerations in the vertical direction shown in FIG. 2) of up to 20 g's, and to transverse accelerations of up to 16.25 g's. An embodiment of the system 10 was found to perform far better than required, have a maximum rotation of 1.84 μrad/g for the maximum acceleration in the axial direction, and maximum rotations of 7.35 μrad/g and 9.57 μrad/g for maximum accelerations in the transverse directions.

In an example embodiment, the system 10 is part of an aerial vehicle such as a missile. In such an embodiment the equipment 12 may be an inertial measurement unit. The axial direction may correspond to the longitudinal axis of the missile or other aerial vehicle, with the transverse directions corresponding to a pair of orthogonal directions perpendicular to the axial direction.

Other possible uses of such isolation systems include use in automobiles (for example in vehicle electronic isolation to prevent CD skip), in medical equipment electronics isolation to attenuate the vibration and shock from the movement, and in bicycle seat suspension to reduce vibration and/or shock from the rough road condition.

The isolation system 10 described above has a low profile which can be easily integrated into any of a variety of small spaces. The configuration allows for attenuation in the low and high frequency ranges, while meeting strict resonant frequency requirements. The isolator and isolation system can be used to minimize the rotations into the guidance electronics or other equipment. The isolator design allows two directional mounting, which can be used when the space is limited.

In addition, the axial and radial mounting scheme of the isolation system 10 minimizes the tolerance stack-up and eliminates the need for shimming. This allows for better manufacturing processes. The mounting scheme also allows for a significant reduction in the handling/assembly loads imparted on to the elastomer.

Figure 9:
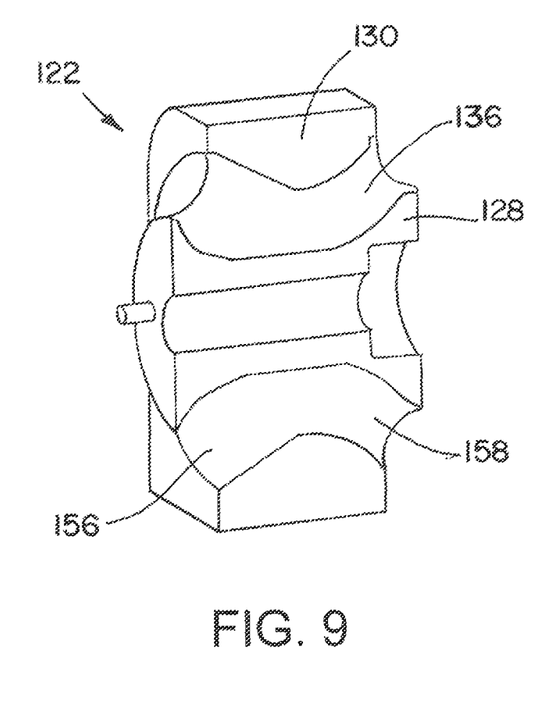
FIG. 9 is a cross-section view of an alternate embodiment isolation mount.

FIG. 9 shows an alternate embodiment isolation mount 122, having an isolation pad 136 between a housing or outer mounting 130, and an inner mounting 128. The isolation mount 122 may be used as a substitute for the isolation mount 22 (FIG. 1) in a system similar to the system 10 (FIG. 1) described above. Unlike the isolation pad 36 (FIG. 3B), the isolation pad 136 has a non-uniform thickness, and has different functions defining the inner and outer boundaries of its two ends 156 and 158. Any of variety of functions of various types may be used to define the shape of the pad 136 to achieve any of a variety of effects.

Figure 10:
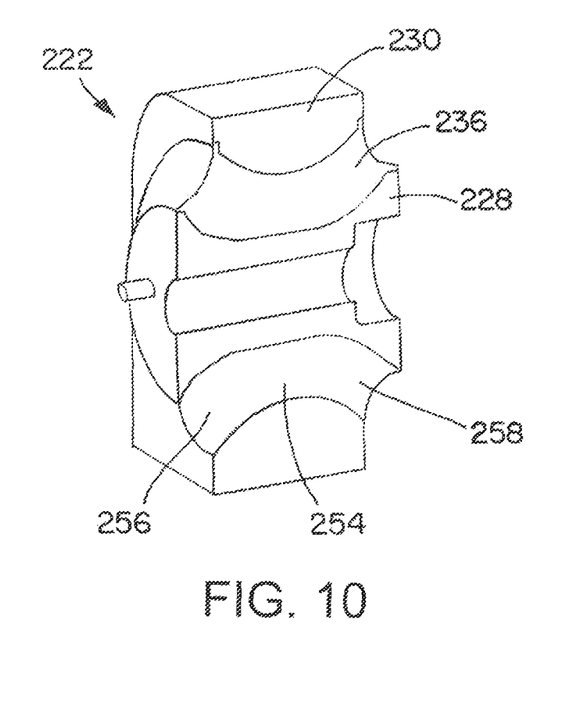
FIG. 10 is a cross-section view of another alternate embodiment isolation mount.

FIG. 10 shows another alternate embodiment isolation mount 222, having an isolation pad 236 between a housing or outer mounting 230, and an inner mounting 228. The isolation mount 222 also may be used as a substitute for the isolation mount 22 (FIG. 1) in a system similar to the system 10 (FIG. 1) described above. The ends 256 and 258 of the isolation pad 236 are flared ends, providing a smooth transition from a central portion 254.

Variations of isolator geometry, such as those shown in FIGS. 9 and 10 (as well as other possibilities), may be used to vary the resonant frequency of the system. Different isolation pad end shapes, angles of the isolation pad ends away from the central portion, and/or functions defining the shapes of the surface of the isolation pad, may be selected to achieve desired effects.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An isolation mount system comprising:
a series of isolation mounts that support and isolate equipment;
wherein each of the isolation mounts includes:
an outer mounting;
an inner mounting radially within the outer mounting, and
an isolation pad between the inner mounting and the outer mounting, the isolation pad providing damping between motions of the inner mounting and the outer mounting;
wherein the isolation pad surrounds a central axis of the mount;
wherein a longitudinally central portion of the isolation pad is radially closer to the central axis than ends of the isolation pad that are on opposite longitudinal ends of the central portion;
wherein a radially inner surface of the isolation pad conforms to a radially outer surface of the inner mounting;
wherein a radially outer surface of the isolation pad conforms to a radially inner surface of the outer mounting, with the radially outer surface extending radially away from the central axis at the ends in longitudinal directions from the central portion to the ends;
wherein the ends of the isolation mounts include ends closer to the equipment and ends farther from the equipment; and
wherein the ends closer to the equipment divert away from the central axis more than the ends farther from the equipment.

2. An isolation mount system comprising:
a series of isolation mounts that support and isolate equipment;
wherein each of the isolation mounts includes:
an outer mounting;
an inner mounting radially within the outer mounting, and
an isolation pad between the inner mounting and the outer mounting, the isolation pad providing damping between motions of the inner mounting and the outer mounting;
wherein the isolation pad surrounds a central axis of the mount;
wherein a longitudinally central portion of the isolation pad is radially closer to the central axis than ends of the isolation pad that are on opposite longitudinal ends of the central portion;
wherein a radially inner surface of the isolation pad conforms to a radially outer surface of the inner mounting;
wherein a radially outer surface of the isolation pad conforms to a radially inner surface of the outer mounting, with the radially outer surface extending radially away from the central axis at the ends in longitudinal directions from the central portion to the ends;
wherein the ends of the isolation mounts include ends closer to the equipment and ends farther from the equipment; and
wherein the ends farther from the equipment divert away from the central axis more than the ends closer to the equipment.

3. The isolation mount system of claim 2, wherein the system includes at least three of the isolation mounts.

4. The isolation mount system of claim 2, wherein the system includes four of the isolation mounts.

5. The isolation mount system of claim 2,
further comprising:
the equipment; and
a cradle for mounting the equipment to the isolation mounts; and
wherein a center of elasticity of the isolation mount system is aligned with a combined center of mass of the equipment and the cradle.

6. The isolation mount system of claim 2, wherein for each of the isolation mounts the isolation pad is made of an elastomer.

7. The isolation mount system of claim 2, wherein for each of the isolation mounts the inner mounting has a through-passage to mount an isolated mass.

8. The isolation mount system of claim 2, wherein for each of the isolation mounts the ends of the isolation pad slope away from the central axis at one or more constant slopes.

9. The isolation mount system of claim 2, wherein for each of the isolation mounts the ends of the isolation pad flare away from the central axis.

10. The isolation mount system of claim 1, wherein the system includes at least three of the isolation mounts.

11. The isolation mount system of claim 1, wherein the system includes four of the isolation mounts.

12. The isolation mount system of claim 1, further comprising:
   the equipment; and
   a cradle for mounting the equipment to the isolation mounts; and
   wherein a center of elasticity of the isolation mount system is aligned with a combined center of mass of the equipment and the cradle.

13. The isolation mount system of claim 1, wherein for each of the isolation mounts the isolation pad is made of an elastomer.

14. The isolation mount system of claim 1, wherein for each of the isolation mounts the inner mounting has a through-passage to mount an isolated mass.

15. The isolation mount system of claim 1, wherein for each of the isolation mounts the ends of the isolation pad slope away from the central axis at one or more constant slopes.

16. The isolation mount system of claim 1, wherein for each of the isolation mounts the ends of the isolation pad flare away from the central axis.

\* \* \* \* \*